W. FISHER.

Fifth-Wheel for Platform Wagons.

No. 7,917. Reissued Oct. 16, 1877.

WITNESSES

H. S. Jewell.

D. L. Hazard

INVENTOR

Willett Fisher by J. R. Nottingham

Asso. ATTORNEY

N. PETERS, PHOTO-LITHOGRAPHER, WASHINGTON, D. C.

UNITED STATES PATENT OFFICE.

WILLETT FISHER, OF HOMER, NEW YORK.

IMPROVEMENT IN FIFTH-WHEELS FOR PLATFORM-WAGONS.

Specification forming part of Letters Patent No. 153,327, dated July 21, 1874; Reissue No. 7,917, dated October 16, 1877; application filed August 20, 1877.

*To all whom it may concern:*

Be it known that I, WILLETT FISHER, of the town of Homer, in the county of Cortland and State of New York, have invented certain new and useful Improvements in Platform-Wagons; and I do hereby declare that the following is a full, clear, and exact description thereof, reference being had to the accompanying drawings, and to the letters of reference marked thereon, which form part of this specification.

The nature of my invention consists in the construction and arrangement of the front running-gear for platform spring-wagons, as will be hereinafter more fully set forth.

Figure 1:
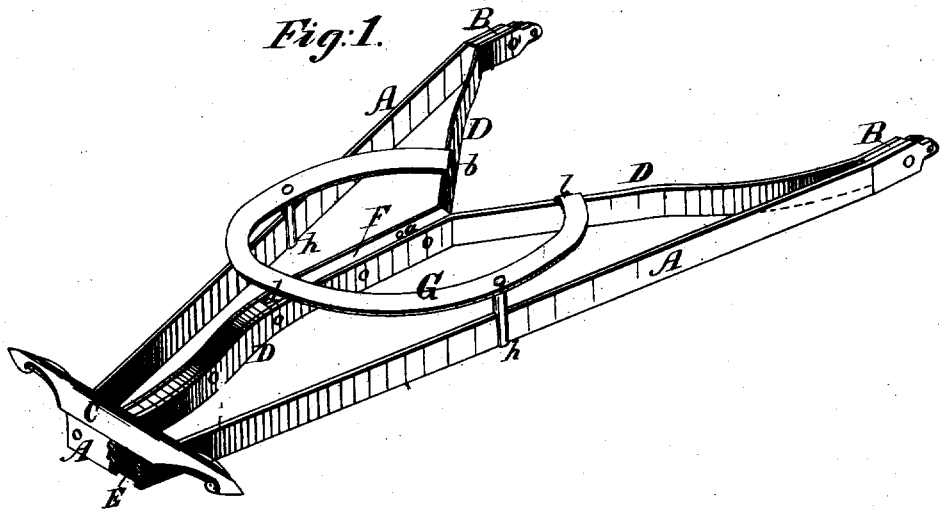
Figure 2:
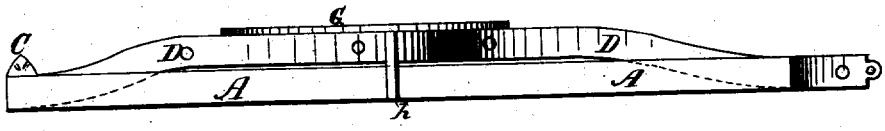

In the accompanying drawing, Figure 1 represents a perspective view of my invention, and Fig. 2 a side elevation thereof.

A is the outside futchell, and is made of one continuous piece of steel, malleable iron, or other suitable material, bent substantially to a V shape, running from the block B to the cross spring-bar C, thence along the bar C, around the filling-block E, and back to the block B on the other side.

D D are the inside futchells, each running from one of the blocks B to or near to the center or king bolt *a*, forming a brace to the side futchell, thence running parallel with each other to the cross-bar C, at which points the ends of both turn outwardly to meet the sides of the outer futchell A.

B B are filling-blocks between the front ends of the futchells A and D D, and E is a filling-block between the angle of the outer futchell and the outwardly-turned rear ends of the futchells D D.

F is a center-bar, usually of wood, bolted between the parallel sides of the inner futchells, and mortised at the rear end, or fastened to either the cross-bar C or the filling-block E resting against said cross-bar.

The inside futchells D D are made arching, usually about one and three-fourths inch from the point *b* to the blocks B B, and from the point *d* to the cross-bar C. The outside futchell A runs straight from each block B to the bar C. By this arrangement of the futchells the central sections of the inner ones D D, between the points *b* and *d* and the front portion of the central bar F, are raised above the plane of the outside futchells and the blocks B B and E.

G represents the fifth-wheel, placed upon the elevated center sections of the inside futchells D D, and attached to the outside futchell A by posts *h h* and clips upon the inner futchells.

The inside futchells being arched and bracing laterally from the blocks B B to the king-bolt *a*, and the outside futchell running straight, a great amount of strength is given, and a direct center draft obtained from the king-bolt *a*.

The front ends of the futchells are bolted through and through to the filling-blocks B B. The inside futchells D D are bolted through and through to the central bar F, and their outwardly-turned rear ends and the rear end of the outside futchell A are bolted to the filling-block E.

The advantages derived from the filling-blocks B B and E are that they not only add to the strength of the gear, but at the same time they are light, and increase the permanence and stability of the bolting of the futchells together. The same may be said, also, of the center bar F. It supports and strengthens the inside futchells, between which it is bolted, and makes their bolting much more durable than if the parallel portions of said futchells were bolted close against each other, without anything to serve as a filling-block between them.

I am aware that fifth-wheels have been constructed which bear some general resemblance to mine. The novelty of my improvement consists, however, in the construction and arrangement of the parts and the use of filling-blocks, all of which I believe to possess advantages peculiar to it alone.

Having thus fully described my invention, what I claim as new, and desire to secure by Letters Patent, is—

1. A fifth-wheel running-gear for vehicles, having outside futchell A, made of one continuous piece, the inside futchells D D, cross-bar C, center bar F, fifth-wheel G, and filling-blocks B B and E, made substantially as and for the purposes set forth.

2. In a fifth-wheel running-gear for wagons, the outside futchell A, made in one continuous piece, and bent in V shape, in combination with the filling-block E, substantially as described.

3. In a fifth-wheel running-gear for wagons, the inner futchells D D, with elevating arches, and the filling-block F, said futchells being bolted to the filling-block, as shown, and branching outwardly from said block in Y form, substantially as set forth.

4. In a fifth-wheel gear for vehicles, the combination of the outer futchell A, formed in one continuous piece, with the inner futchells D D, secured to the filling-block F, substantially as described.

5. In a fifth-wheel gear for vehicles, the inside futchells D D, made substantially as described, in combination with the center bar F, as and for the purposes set forth.

6. The filling-blocks B B and E, in combination with outside and inside futchells of a running-gear, substantially as and for the purposes set forth.

7. A wagon-trestle having the fifth-wheel G elevated above the outside futchell A by the forged posts *h h*, and supported upon and attached to the arched curved portions of the inside futchells by flanges *b b*, substantially as described.

WILLETT FISHER.

Witnesses:
C. H. DUELL,
DORR C. SMITH.